United States Patent
Schulte

(10) Patent No.: US 12,254,088 B2
(45) Date of Patent: Mar. 18, 2025

(54) SYSTEMS, METHODS, AND MEDIA FOR PREVENTING TROJAN SOURCE ATTACKS

(71) Applicant: Skyhigh Security LLC, Plano, TX (US)

(72) Inventor: Felix Schulte, Paderborn (DE)

(73) Assignee: Skyhigh Security LLC, Plano, TX (US)

( * ) Notice: Subject to any disclaimer, the term of this patent is extended or adjusted under 35 U.S.C. 154(b) by 295 days.

(21) Appl. No.: 18/091,029

(22) Filed: Dec. 29, 2022

(65) Prior Publication Data

US 2024/0220620 A1 Jul. 4, 2024

(51) Int. Cl.
*G06F 21/56* (2013.01)

(52) U.S. Cl.
CPC ...... *G06F 21/566* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 8,756,696 B1* | 6/2014 | Miller | ..................... | G06F 21/53 726/25 |
| 9,798,878 B1* | 10/2017 | Hittel | ..................... | G06F 21/565 |
| 2014/0157441 A1* | 6/2014 | Georgiev | ................ | G06F 16/84 726/32 |
| 2017/0346851 A1* | 11/2017 | Drake | ................... | H04L 9/0838 |
| 2018/0288086 A1* | 10/2018 | Amiri | ..................... | G06N 3/08 |

* cited by examiner

*Primary Examiner* — Raqiul A Choudhury
(74) *Attorney, Agent, or Firm* — Byrne Poh LLP

(57) ABSTRACT

Mechanisms for preventing trojan source attacks are provided, the mechanisms including: receiving first Web page content; determining first one or more languages associated with the first Web page content; determining if the first one or more languages use BIDI characters; and in response to determining that the first one or more languages do not use BIDI characters: searching the Web page content for first reference BIDI characters; and blocking the Web page content in response to finding the first reference BIDI characters in the Web page content. In some embodiments, the mechanisms further include: receiving second Web page content; determining second one or more languages associated with the second Web page content; determining if the second one or more languages use BIDI characters; and in response to determining that the second one or more languages do use BIDI characters, allowing the Web page content.

9 Claims, 3 Drawing Sheets

SYSTEMS, METHODS, AND MEDIA FOR PREVENTING TROJAN SOURCE ATTACKS

BACKGROUND

A trojan source attack is a type of computer attack that abuses Unicode's bidirectional (BIDI) characters to display source code differently that the actual execution of the source code. For example, if a Web page includes certain Unicode BIDI characters, source code for the Web page can display differently that the actual execution of the source code, which can compromise the computer in which the source code is executing.

Accordingly, new mechanisms for preventing trojan source attacks are desirable.

SUMMARY

In accordance with some embodiments, systems, methods, and media for preventing trojan source attacks are provided.

In some embodiments, systems for preventing trojan source attacks are provided, the systems comprising: a memory; and at least one hardware processor that is coupled to the memory and that is collectively configured to at least: receive first Web page content; determine first one or more languages associated with the first Web page content; determine if the first one or more languages use BIDI characters; and in response to determining that the first one or more languages do not use BIDI characters: search the Web page content for first reference BIDI characters; and block the Web page content in response to finding the first reference BIDI characters in the Web page content. In some of these embodiments, the reference BIDI characters include any BIDI characters. In some of these embodiments, the first reference BIDI characters include one or more of: U+202A; U+202B; U+202D; U+202E; U+2066; U+2067; U+2068; U+202C; and U+2069. In some of these embodiments, the at least one hardware processor is further collectively configured to at least: receive second Web page content; determine second one or more languages associated with the second Web page content; determine if the second one or more languages use BIDI characters; and in response to determining that the second one or more languages do use BIDI characters, allow the Web page content. In some of these embodiments, the at least one hardware processor is further collectively configured to at least: receive third Web page content; determine third one or more languages associated with the third Web page content; determine if the third one or more languages use BIDI characters; and in response to determining that the third one or more languages do not use BIDI characters: search the Web page content for third reference BIDI characters; and allow the Web page content in response to not finding the third reference BIDI characters in the Web page content.

In some embodiments, methods for preventing trojan source attacks are provided, the methods comprising: receiving first Web page content; determining first one or more languages associated with the first Web page content; determining if the first one or more languages use BIDI characters; and in response to determining that the first one or more languages do not use BIDI characters: searching the Web page content for first reference BIDI characters; and blocking the Web page content in response to finding the first reference BIDI characters in the Web page content. In some of these embodiments, the reference BIDI characters include any BIDI characters. In some of these embodiments, the first reference BIDI characters include one or more of: U+202A; U+202B; U+202D; U+202E; U+2066; U+2067; U+2068; U+202C; and U+2069. In some of these embodiments, the methods further comprise: receiving second Web page content; determining second one or more languages associated with the second Web page content; determining if the second one or more languages use BIDI characters; and in response to determining that the second one or more languages do use BIDI characters, allowing the Web page content. In some of these embodiments, the methods further comprise: receiving third Web page content; determining third one or more languages associated with the third Web page content; determining if the third one or more languages use BIDI characters; and in response to determining that the third one or more languages do not use BIDI characters: searching the Web page content for third reference BIDI characters; and allowing the Web page content in response to not finding the third reference BIDI characters in the Web page content.

In some embodiments, non-transitory computer-readable media containing computer executable instructions that, when executed by a processor, cause the processor to perform a method for preventing trojan source attacks are provided, the method comprising: receiving first Web page content; determining first one or more languages associated with the first Web page content; determining if the first one or more languages use BIDI characters; and in response to determining that the first one or more languages do not use BIDI characters: searching the Web page content for first reference BIDI characters; and blocking the Web page content in response to finding the first reference BIDI characters in the Web page content. In some of these embodiments, the reference BIDI characters include any BIDI characters. In some of these embodiments, the first reference BIDI characters include one or more of: U+202A; U+202B; U+202D; U+202E; U+2066; U+2067; U+2068; U+202C; and U+2069. In some of these embodiments, the method further comprises: receiving second Web page content; determining second one or more languages associated with the second Web page content; determining if the second one or more languages use BIDI characters; and in response to determining that the second one or more languages do use BIDI characters, allowing the Web page content. In some of these embodiments, the method further comprises: receiving third Web page content; determining third one or more languages associated with the third Web page content; determining if the third one or more languages use BIDI characters; and in response to determining that the third one or more languages do not use BIDI characters: searching the Web page content for third reference BIDI characters; and allowing the Web page content in response to not finding the third reference BIDI characters in the Web page content.

DETAILED DESCRIPTION

In accordance with some embodiments, mechanisms (which can include methods, systems, and media) for preventing trojan source attacks are provided.

In some embodiments, trojan source attacks can be prevented by receiving Web page content, determining one or more languages used in that content, and determining if the language(s) used uses BIDI characters, and determining if BIDI characters are found in the content. If BIDI characters are not used in the language(s) used but BIDI characters are present in the content, the content and/or BIDI characters can be blocked to prevent a possible trojan source attack. Otherwise, the content and/or BIDI characters can be allowed.

Figure 1:
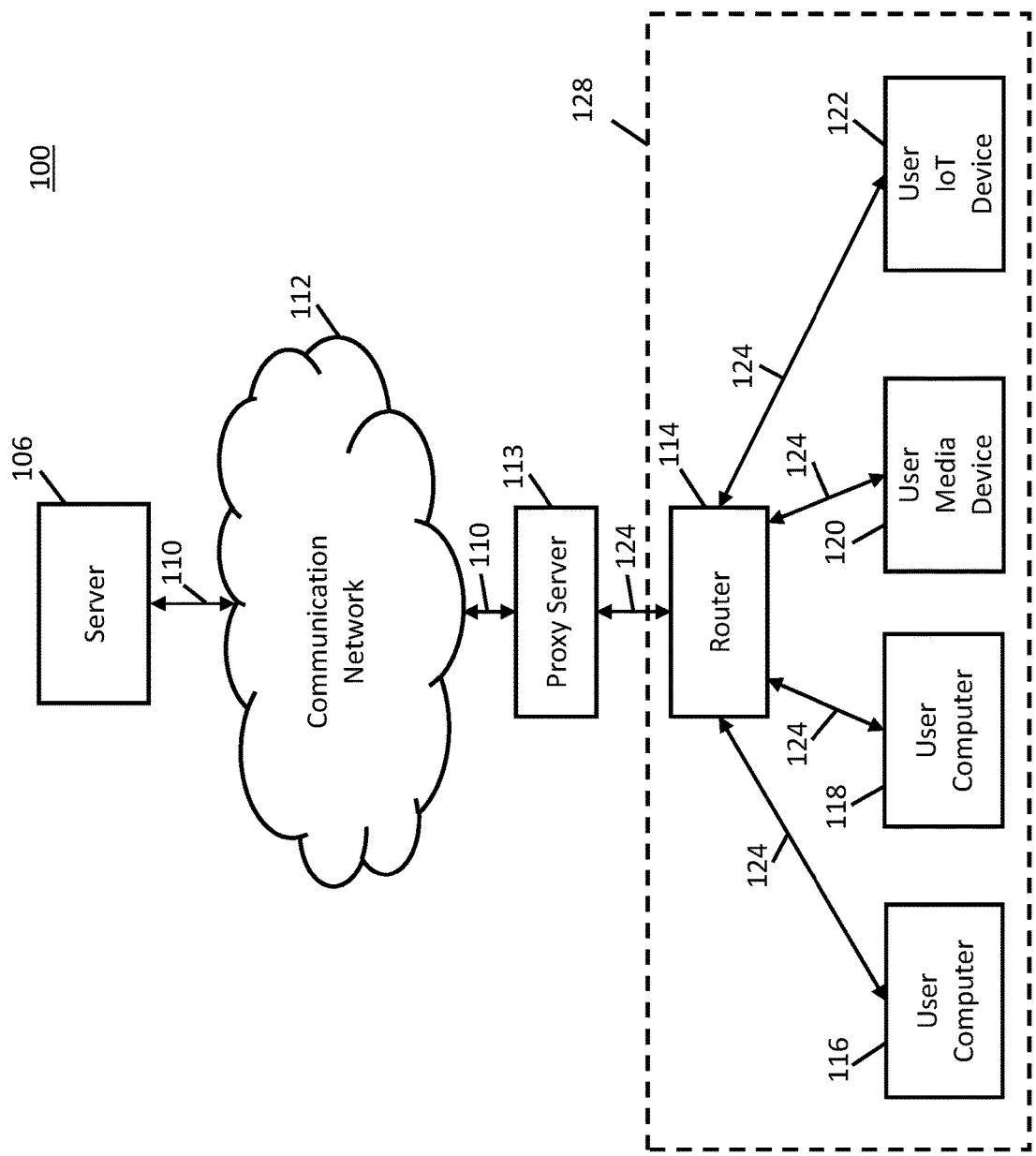
FIG. 1 illustrates an example of hardware that can be used in accordance with some embodiments.

Turning to FIG. 1, an example 100 of hardware that can be used in accordance with some embodiments of the disclosed subject matter is shown. As illustrated, hardware 100 can include a server 106, a communication network 112, a proxy server 113, a router 114, a user computers 116 and 118, a user media device 120, and a user Internet-of-Things (IoT) device 122.

Server 106 can be any suitable server for providing Web page content to a user device. For example, in some embodiments, server 106 can be a Web server hosting a Web page having any suitable content. The content on such a Web page can be accessed by user computers 116 and 118, user media device 120, and/or user IoT device 122, in some embodiments.

Communication network 112 can be any suitable combination of one or more wired and/or wireless networks in some embodiments. For example, in some embodiments, communication network 112 can include any one or more of the Internet, a mobile data network, a satellite network, a local area network, a wide area network, a telephone network, a cable television network, a WiFi network, a WiMax network, and/or any other suitable communication network.

In some embodiments, communication network 112 and the devices connected to it can form or be part of a wide area network (WAN).

Proxy server 113 can be any suitable device that can act as an intermediary between server 106 and user devices 116, 118, 120, and 122. In some embodiments, proxy server 113 can execute a process (among other processes in some embodiments) as described below in connection with FIG. 3.

Server 106 and proxy server 113 can be connected by one or more communications links 110 to communication network 112. The communications links can be any communications links suitable for communicating data among server 106, proxy server 113, and communication network 112, such as network links, dial-up links, wireless links, hard-wired links, any other suitable communications links, or any suitable combination of such links.

Router 114 can be any suitable router. For example, in some embodiments, router 114 can be a WiFi router and/or a wired router for routing traffic between user computers 116 and 118, user media device 120, user Internet-of-Things (IoT) device 122, and/or proxy server 113. In some embodiments, router 114 can execute a process (among other processes in some embodiments) as described below in connection with FIG. 3.

User computers 116 and 118 can be any suitable computers, such as desktop computers, laptop computers, tablet computer, smart phones, and/or any other suitable computing devices, and can perform any suitable functions.

User media device 120 can be any suitable device for streaming media, such as a media player box, a media player dongle (which can stream video and audio, video only, or audio only), a smart television, an audio-visual (AV) receiver, etc.

User IoT device 122 can be any suitable Internet of Things device, such as an internet protocol (TP) camera, a smart smoke alarm, a smart thermostat, a smart lock, an alarm, a sensor, a smart light bulb, a smart hub, a smart speaker, and/or any other device that can be connected to a computer network.

User computers 116 and 118, user media device 120, and user IoT device 122 can be connected by one or more communications links 124 to router 114. The communications links can be any communications links suitable for communicating data among user computers 116 and 118, user media device 118, user IoT device 122, and router 114, such as network links, dial-up links, wireless links, hard-wired links, any other suitable communications links, or any suitable combination of such links.

In some embodiments, user computers 116 and 118, user media device 120, user IoT device 122, communications links 124, and router 114 can form or be part of a local area network 128.

Although one server 106, one proxy server 113, one router 114, two user computers 116 and 118, one user media device 120, and one user IoT device 122 are shown in FIG. 1 to avoid over-complicating the figure, any suitable numbers (including zero for devices 106, 113, 114, 116, 118, 120, and 122 in some embodiments) of these devices can be used in some embodiments.

Figure 2:
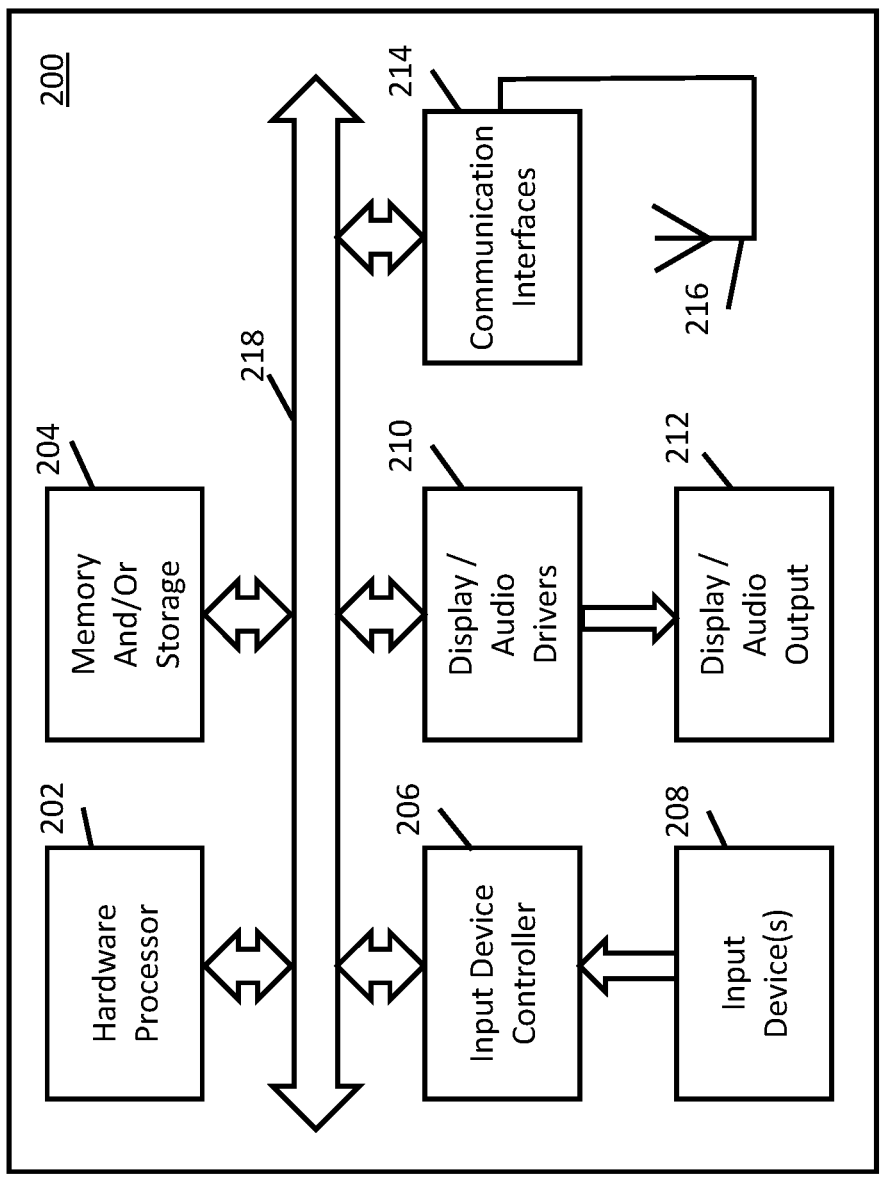
FIG. 2 illustrates a more particular example of hardware that can be used for certain components of the hardware of FIG. 1 in accordance with some embodiments.

Server 106, proxy server 113, router 114, user computers 116 and 118, user media device 120, and/or user IoT device 122 can be implemented using any suitable hardware in some embodiments. For example, in some embodiments, server 106, proxy server 113, router 114, user computers 116 and 118, user media device 120, and/or user IoT device 122 can be implemented using any suitable general-purpose computer or special-purpose computer. For example, a proxy server can be implemented using a special-purpose computer. Any such general-purpose computer or special-purpose computer can include any suitable hardware. For example, as illustrated in example hardware 200 of FIG. 2, such hardware can include hardware processor 202, memory and/or storage 204, an input device controller 206, an input device 208, display/audio drivers 210, display and audio output circuitry 212, communication interface(s) 214, an antenna 216, and a bus 218.

Hardware processor 202 can include any suitable hardware processor, such as a microprocessor, a micro-controller, digital signal processor(s), dedicated logic, and/or any other suitable circuitry for controlling the functioning of a general-purpose computer or a special purpose computer in some embodiments.

Memory and/or storage 204 can be any suitable memory and/or storage for storing programs, data, and/or any other suitable information in some embodiments. For example, memory and/or storage 204 can include random access memory, read-only memory, flash memory, hard disk storage, optical media, and/or any other suitable memory.

Input device controller 206 can be any suitable circuitry for controlling and receiving input from input device(s) 208 in some embodiments. For example, input device controller 206 can be circuitry for receiving input from an input device 208, such as a touch screen, from one or more buttons, from a voice recognition circuit, from a microphone, from a camera, from an optical sensor, from an accelerometer, from a temperature sensor, from a near field sensor, and/or any other type of input device.

Display/audio drivers 210 can be any suitable circuitry for controlling and driving output to one or more display/audio output circuitries 212 in some embodiments. For example, display/audio drivers 210 can be circuitry for driving one or more display/audio output circuitries 212, such as an LCD display, a speaker, an LED, or any other type of output device.

Communication interface(s) 214 can be any suitable circuitry for interfacing with one or more communication networks, such as network 112 as shown in FIG. 1. For example, interface(s) 214 can include network interface card circuitry, wireless communication circuitry, and/or any other suitable type of communication network circuitry.

Antenna 216 can be any suitable one or more antennas for wirelessly communicating with a communication network in some embodiments. In some embodiments, antenna 216 can be omitted when not needed.

Bus 218 can be any suitable mechanism for communicating between two or more components 202, 204, 206, 210, and 214 in some embodiments.

Any other suitable components can additionally or alternatively be included in hardware 200 in accordance with some embodiments.

Figure 3:
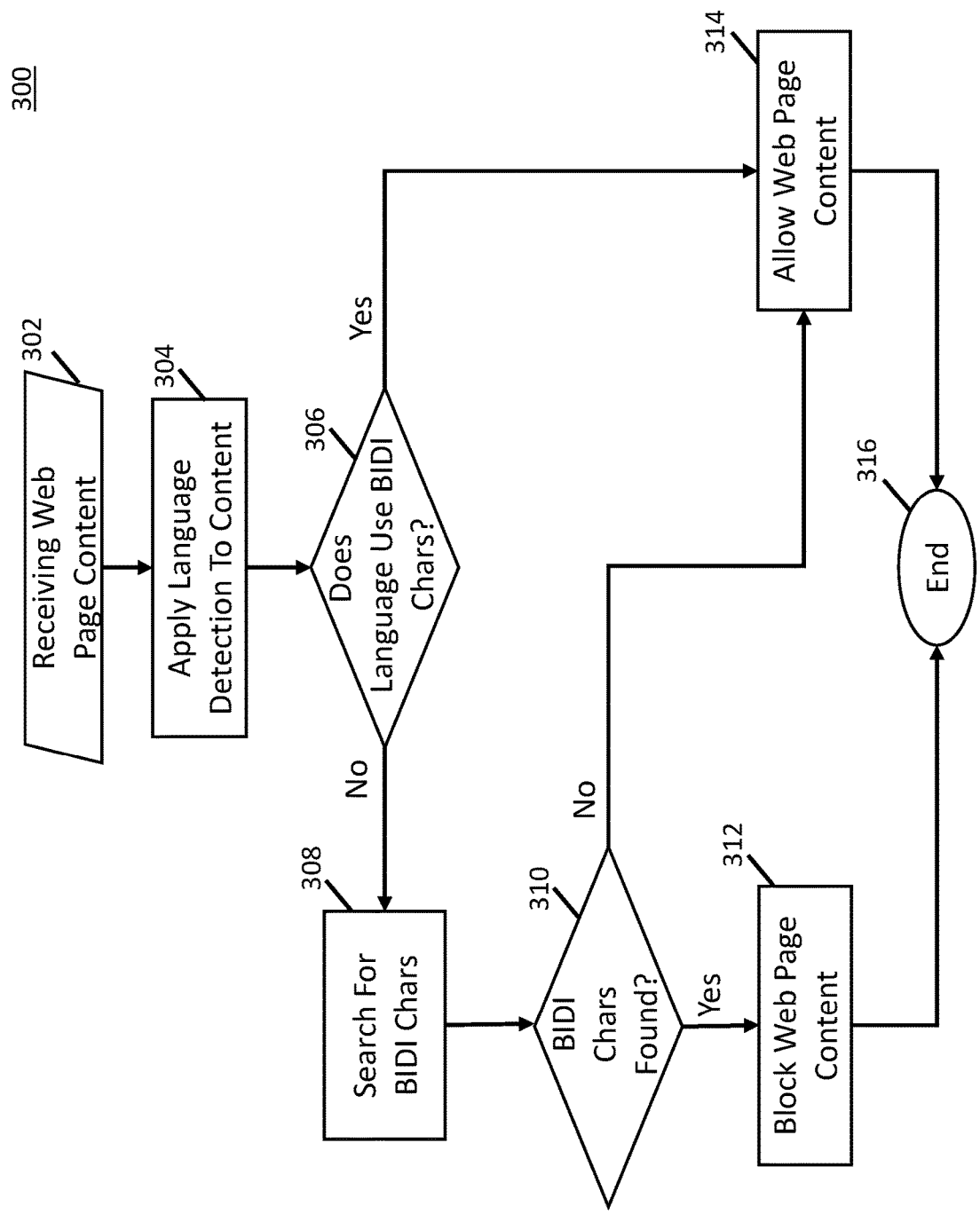
FIG. 3 illustrates an example of a process for preventing trojan source attacks in accordance with some embodiments.

Turning to FIG. 3, an example 300 of a process for in accordance with some embodiments is shown. In some embodiments, process 300 can be executed in any suitable devices, such as proxy server 113, router 114, user computer 116 and/or 118, user media device 120, and/or user IoT device 122.

As illustrated in FIG. 3, process 300 can begin at 302 by receiving the content of a Web page. Any suitable Web page content can be received, and the content can be received in any suitable manner, in some embodiments. For example, the content can be received in response to an HTTP GET request issued by a Web browser.

Next, at 304, process 300 can apply language detection to the content of the Web page to determine the language(s) used in the content. Any suitable language detection technique can be applied, and the technique can be applied in any suitable manner, in some embodiments. For example, in some embodiments, one or headers of the URL of the Web page can be inspected for indicators of the language(s) used in the content of the Web page, and/or natural language processing can be performed on the language of the content of the Web page to determine language(s) used.

Then, at 306, process can determine if the language(s) used in the content uses BIDI characters. This determination can be made in any suitable manner. For example, in some embodiments, the determination can be made by checking a database language information to determine if each of the language(s) used includes BIDI characters.

If it is determined at 306 that the used language(s) do not use BIDI characters, then at 308, process 300 can search the content of the Web page for BIDI characters. This search can be performed in any suitable manner in some embodiments. For example, in some embodiments, this search can determine if any or if only certain BIDI characters are present in the content. More particularly, for example, this search can check to determine if the BIDI characters U+202A, U+202B, U+202D, U+202E, U+2066, U+2067, U+2068, U+202C, and/or U+2069 are present in the content.

Next, at 310, process can determine if the search performed at 308 found the searched-for BIDI characters. If the searched-for BIDI characters were found, then process 300 can block the content of the Web page, or block the BIDI characters in the content of the Web page, at 312 and end at 316. The content of the Web page, or the BIDI characters in the content of the Web page, can be blocked in any suitable manner in some embodiments, such as by dropping the content or the BIDI characters and not passing the content or the BIDI characters to a Web browser, in some embodiments.

Otherwise, if the searched-for BIDI characters were determined at 310 to have not been found at 308, or if it was determined at 306 that the language(s) used in the content do use BIDI characters, then process can allow the Web page content at 314 and end at 316. The Web page content can be allowed in any suitable manner in some embodiments, such as by passing the Web page content to a browser for display to a user, in some embodiments.

It should be understood that at least some of the above-described blocks of the process of FIG. 3 can be executed or performed in any order or sequence not limited to the order and sequence shown in and described in the figure. Also, some of the above blocks of the process of FIG. 3 can be executed or performed substantially simultaneously where appropriate or in parallel to reduce latency and processing times. Additionally or alternatively, some of the above described blocks of the process of FIG. 3 can be omitted.

In some embodiments, any suitable computer readable media can be used for storing instructions for performing the functions and/or processes described herein. For example, in some embodiments, computer readable media can be transitory or non-transitory. For example, non-transitory computer readable media can include media such as non-transitory magnetic media (such as hard disks, floppy disks, and/or any other suitable magnetic media), non-transitory optical media (such as compact discs, digital video discs, Blu-ray discs, and/or any other suitable optical media), non-transitory semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for preventing trojan source attacks are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for preventing trojan source attacks, comprising:
 a memory; and
 at least one hardware processor that is coupled to the memory and that is collectively configured to at least:
  receive first Web page content;
  determine first one or more languages associated with the first Web page content;
  determine if the first one or more languages use Unicode's bidirectional BIDI) characters; and
  in response to determining that the first one or more languages do not use BIDI characters:

search the Web page content for first reference BIDI characters, wherein the first reference BIDI characters include one or more of: U+202A; U+202B; U+202D; U+202E; U+2066; U+2067; U+2068; U+202C; and U+2069; and block the Web page content in response to finding the first reference BIDI characters in the Web page content.

2. The system of claim 1, wherein the at least one hardware processor is further collectively configured to at least:

receive second Web page content;

determine second one or more languages associated with the second Web page content;

determine if the second one or more languages use BIDI characters; and in response to determining that the second one or more languages do use BIDI characters, allow the Web page content.

3. The system of claim 1, wherein the at least one hardware processor is further collectively configured to at least:

receive third Web page content;

determine third one or more languages associated with the third Web page content;

determine if the third one or more languages use BIDI characters; and in response to determining that the third one or more languages do not use BIDI characters:

search the Web page content for third reference BIDI characters; and allow the Web page content in response to not finding the third reference BIDI characters in the Web page content.

4. A method for preventing trojan source attacks, comprising:

receiving first Web page content;

determining first one or more languages associated with the first Web page content;

determining if the first one or more languages use BIDI Unicode's bidirectional (BIDI) characters; and in response to determining that the first one or more languages do not use BIDI characters:

searching the Web page content for first reference BIDI characters, wherein the first reference BIDI characters include one or more of: U+202A; U+202B; U+202D; U+202E; U+2066; U+2067; U+2068; U+202C; and U+2069; and blocking the Web page content in response to finding the first reference BIDI characters in the Web page content.

5. The method of claim 4, further comprising:

receiving second Web page content;

determining second one or more languages associated with the second Web page content;

determining if the second one or more languages use BIDI characters; and in response to determining that the second one or more languages do use BIDI characters, allowing the Web page content.

6. The method of claim 4, further comprising:

receiving third Web page content;

determining third one or more languages associated with the third Web page content;

determining if the third one or more languages use BIDI characters; and in response to determining that the third one or more languages do not use BIDI characters:

searching the Web page content for third reference BIDI characters; and allowing the Web page content in response to not finding the third reference BIDI characters in the Web page content.

7. A non-transitory computer-readable medium containing computer executable instructions that, when executed by a processor, cause the processor to perform a method for preventing trojan source attacks, the method comprising:

receiving first Web page content;

determining first one or more languages associated with the first Web page content;

determining if the first one or more languages use BIDI Unicode's bidirectional (BIDI) characters; and in response to determining that the first one or more languages do not use BIDI characters:

searching the Web page content for first reference BIDI characters, wherein the first reference BIDI characters include one or more of: U+202A; U+202B; U+202D; U+202E; U+2066; U+2067; U+2068; U+202C; and U+2069; and blocking the Web page content in response to finding the first reference BIDI characters in the Web page content.

8. The non-transitory computer-readable medium of claim 7, wherein the method further comprises:

receiving second Web page content;

determining second one or more languages associated with the second Web page content;

determining if the second one or more languages use BIDI characters; and in response to determining that the second one or more languages do use BIDI characters, allowing the Web page content.

9. The non-transitory computer-readable medium of claim 7, wherein the method further comprises:

receiving third Web page content;

determining third one or more languages associated with the third Web page content;

determining if the third one or more languages use BIDI characters; and in response to determining that the third one or more languages do not use BIDI characters:

searching the Web page content for third reference BIDI characters; and allowing the Web page content in response to not finding the third reference BIDI characters in the Web page content.

* * * * *